(12) United States Patent
Okazaki et al.

(10) Patent No.: US 12,518,534 B2
(45) Date of Patent: Jan. 6, 2026

(54) ANALYSIS SYSTEM AND CONTROL METHOD FOR ANALYSIS SYSTEM

(71) Applicant: Konica Minolta, Inc., Tokyo (JP)

(72) Inventors: Tomoya Okazaki, Tokyo (JP); Nozomu Tanaka, Tokyo (JP); Naoki Ikeda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 400 days.

(21) Appl. No.: 18/006,865

(22) PCT Filed: Apr. 28, 2021

(86) PCT No.: PCT/JP2021/016969
§ 371 (c)(1),
(2) Date: Jan. 25, 2023

(87) PCT Pub. No.: WO2022/024487
PCT Pub. Date: Feb. 3, 2022

(65) Prior Publication Data
US 2023/0267741 A1 Aug. 24, 2023

(30) Foreign Application Priority Data
Jul. 30, 2020 (JP) ................. 2020-129137

(51) Int. Cl.
*G06V 20/40* (2022.01)
*G06V 10/82* (2022.01)
*G06V 20/52* (2022.01)

(52) U.S. Cl.
CPC .............. *G06V 20/49* (2022.01); *G06V 10/82* (2022.01); *G06V 20/44* (2022.01); *G06V 20/52* (2022.01); *G06V 2201/07* (2022.01)

(58) Field of Classification Search
CPC ........ G06V 20/49; G06V 20/52; G06V 10/82; G06V 20/44; G06V 2201/07
See application file for complete search history.

(56) References Cited

U.S. PATENT DOCUMENTS

2017/0200061 A1* 7/2017 Julian .................. G08G 1/04
2021/0319201 A1* 10/2021 Kale .................... G06N 3/049

FOREIGN PATENT DOCUMENTS

JP 2015-032133 A 2/2015

OTHER PUBLICATIONS

International Search Report issued in corresponding International Application No. PCT/JP2021/016969 mailed Jun. 29, 2021 (5 pages).

(Continued)

*Primary Examiner* — David Perlman
(74) *Attorney, Agent, or Firm* — Osha Bergman Watanabe & Burton LLP

(57) ABSTRACT

An analysis system includes: a terminal that comprises a terminal controller; and a server that comprises a server controller and a communication interface, the terminal controller acquiring original data, converting the original data into a plurality of pieces of small data each having a size smaller than a size of each piece of the original data and into certainty factors of respective pieces of the small data, and transmitting the small data to the server, and the server controller receiving the small data from the terminal via the communication interface, executing analysis using the small data, and outputting an analysis result of the analysis.

11 Claims, 13 Drawing Sheets

(56) References Cited

OTHER PUBLICATIONS

Written Opinion issued in corresponding International Application No. PCT/JP2021/016969 mailed Jun. 29, 2021 (3 pages).

\* cited by examiner

FIG.8
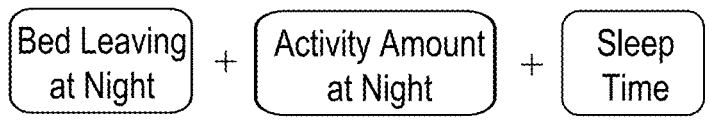
Change Daytime Care Plan
Reduce Burden on Night Staff
FIG.9
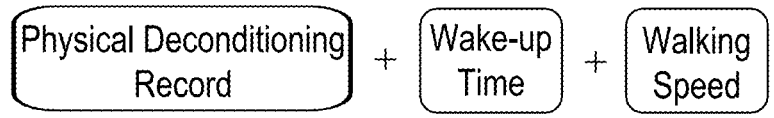
Change Care by Detection of Deterioration in Physical Condition
Reduce Risk of Hospitalization
Improve Operation Rate of Caring Facility Early Detection of Decrease in Cognitive Function Improve QOL of Resident and Staff

ANALYSIS SYSTEM AND CONTROL METHOD FOR ANALYSIS SYSTEM

CROSS-REFERENCE TO RELATED APPLICATION

The entire disclosure of Japanese patent application No. 2020-129137 filed on Jul. 30, 2020, including description, claims, drawings, and abstract, is incorporated herein by reference.

BACKGROUND

Technical Field

The present invention relates to an analysis system, a recording medium storing instructions for the analysis system, a recording medium storing instructions, and a control method for the analysis system.

Description of Related Arts

There is known a technique of detecting a posture, an action, or the like of a subject by analyzing an image detected by an edge device such as a imaging apparatus, and utilizing the posture, the action, or the like for care, marketing, or the like.

Patent Literature 1 describes the following prior art. A video imaging apparatus extracts an object area from an image data frame constituting image data, identifies an object type based on a first feature amount in the object area, and calculates an object type certainty factor based on a second feature amount in the object area. The data frame is transmitted to a server and stored in association with each of the object type and the object type certainty factor. Then, in response to a request of a user, images of an object and the object type certainty factor corresponding to a designated object type are displayed in descending order of the object type certainty factor. As a result, it is possible to efficiently and completely search for the object of a specific type from a video.

PATENT LITERATURE

Patent Literature 1: Japanese Patent Application Laid-Open No. 2015-32133

However, in the above-described prior art, since the data frame (original image data) is transmitted to the server side and stored, a communication volume, the privacy protection, and the data management cost would cause issues. Furthermore, a detection result from the data acquired by the edge device such as the imaging apparatus is only made easy to search for the object using the certainty factor of the detection result, and it is not possible to cope with obtaining a processing result with high added value.

SUMMARY

One or more embodiments of the present invention provide an analysis system, a recording medium storing instructions for the analysis system, a recording medium storing instructions, and a control method for the analysis system capable of obtaining new data with high reliability and high added value by transmitting small data having a reduced size and analyzing the small data at a transmission destination.

The present inventors have been able to provide a system that deals with the issues of the communication volume, the privacy protection, and the data management cost by transmitting small data (processed data) having a reduced size to the server side without transmitting original data to the server side, and further solves the difficulty of information analysis that newly occurs by using the small data.

One or more embodiments of the present invention deal with the above issues by the following means.

(1) An analysis system including: a terminal that comprises a terminal controller and a server that comprises a server controller and a communication interface, in which the terminal controller: acquires original data, converts the original data into a plurality of pieces of small data each having a size smaller than a size of each piece of the original data and into certainty factors of respective pieces of the small data, and transmits at least the small data to the server, and wherein the server controller: receives at least small data from the terminal via the communication interface, executes analysis using the small data, and outputs an analysis result of the analysis.

(2) The analysis system according to (1), wherein the terminal controller transmits, among the small data to the server, small data having the certainty factors each of which is equal to or greater than a first threshold and does not transmit small data having the certainty factors each of which is less than the first threshold.

(3) The analysis system according to (1), wherein the terminal controller transmits a combination of the small data and the certainty factors of the small data, the server controller receives the combination of the small data and the certainty factor of the small data, and executes the analysis using the small data and the certainty factors of the small data.

(4) The analysis system according to (3), wherein the server controller executes the analysis using the small data having the certainty factors each of which is equal to or greater than a second threshold.

(5) The analysis system according to (3) or (4), wherein the server controller weights the small data by using the certainty factors of the small data, respectively, and executes the analysis using the weighted small data.

(6) The analysis system according to (3), wherein the server controller executes the analysis based on the small data and the certainty factors using a learned model which is machine-learned.

(7) The analysis system according to (2), wherein the terminal controller converts the original data into the small data and into the certainty factors of the small data by using a learned model which is machine-learned, wherein the analysis system further includes a reception device which receives a correct answer of the small data corresponding to the original data, and wherein the terminal controller makes the learned model relearn by using a combination of the original data and the correct answer of the small data corresponding to the original data as teacher data.

(8) The analysis system according to (2), further including a reception device which receives a correct answer of the small data corresponding to the original data, wherein the terminal controller varies the first threshold based on the small data, the certainty factors, and the correct answer.

(9) The analysis system according to (3) or (4), further including a reception device which receives a correct answer of the small data corresponding to the original data, wherein the server controller changes an analysis method using the certainty factors based on the small data, the certainty factors, and the correct answer.

(10) The analysis system according to (6), further including a reception device which receives a correct answer of the analysis result, corresponding to the original data, wherein the server controller generates a learned model having learned by using, as teacher data, a combination of the small data, the certainty factors of the small data, which are converted from the original data, and the correct answer of the analysis result corresponding to the original data.

(11) A non-transitory computer-readable recording medium storing instructions executed by a computer to cause an analysis system having a terminal and a server to execute a process, the process including: (a) acquiring original data in the terminal; (b) converting the original data into a plurality of pieces of small data each having a size smaller than a size of each piece of the original data and into certainty factors of respective pieces of the small data; (c) transmitting at least the small data to the server; (d) executing analysis using the small data received by the server; and (e) outputting an analysis result in the procedure (d).

(12) A non-transitory computer-readable recording medium storing instructions executed by a computer to cause an analysis device having a communication interface to execute a process, the process including: (f) receiving, via the communication interface, a combination of a plurality of pieces of small data each having a size smaller than a size of each piece of original data, and certainty factors of respective pieces of the small data, the small data and the certainty factors being obtained by converting the original data; (g) executing analysis using the small data and the certainty factors; and (h) outputting an analysis result in the step (g).

(13) A control method for an analysis system having a terminal and a server, the method including: (a) acquiring original data in the terminal; (b) converting the original data into a plurality of pieces of small data each having a size smaller than a size of each piece of the original data and into certainty factors of respective pieces of the small data; (c) transmitting at least the small data to the server; a (d) executing analysis using the small data received by the server; and (e) outputting an analysis result in the step (d).

The original data is converted into small data having a size smaller than that of the original data and certainty factors of the small data, at least the small data are transmitted to the server, the server performs analysis by using the plurality of pieces of the small data, and an analysis result is output. As a result, it is possible to obtain new data with high reliability and high added value by transmitting the small data having a reduced size and analyzing the small data at the transmission destination.

BRIEF DESCRIPTION OF DRAWINGS

FIG. 8 is an explanatory diagram illustrating an example of use of an analysis result by the server.

FIG. 9 is an explanatory diagram illustrating an example of use of an analysis result by the server.

DETAILED DESCRIPTION OF EMBODIMENTS

Figure 1:
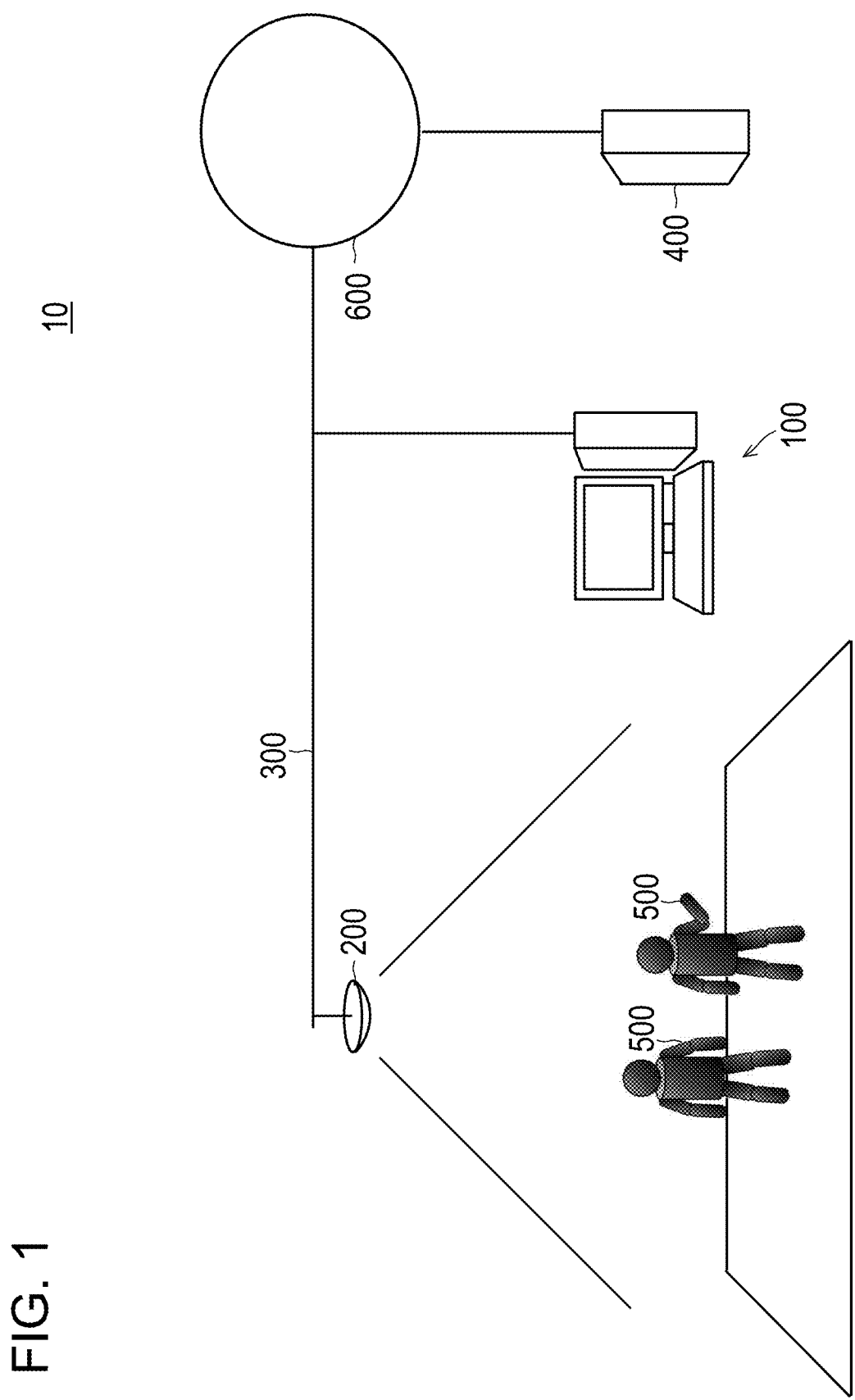
FIG. 1 is a diagram illustrating a schematic structure of an analysis system.

Hereinafter, an analysis system, a recording medium storing instructions for the analysis system, a recording medium storing instructions for an analysis device, and a control method for the analysis system according to embodiments of the present invention will be described with reference to the drawings. Note that in the drawings, the same elements are denoted by the same reference numerals, and redundant description will be omitted. In addition, dimensional ratios in the drawings are exaggerated for convenience of description, and may be different from actual ratios.

First Embodiment

FIG. 1 is a diagram illustrating a schematic structure of an analysis system 10. An example of the analysis system 10 illustrated in FIG. 1 includes a terminal 100, an imaging apparatus 200, a communication network 300, and a server 400. The imaging apparatus 200 is an example of the edge device. The edge device includes an image sensor, a microphone, and a scanner in addition to the imaging apparatus 200. The microphone includes a speaker or the like corresponding to an interactive voice operation with a built-in microphone, such as a smart speaker. The data acquired by the edge device includes image data, sound data (including data obtained by frequency analysis of sound), tactile data, olfactory data, documents (text data and the like), and spoken words (including words and the like recognized from the voice of the spoken words). The data acquired by the edge device constitutes original data. An image (hereinafter, also simply referred to as a "captured image 250") (see FIGS. 5 and 6) captured by the imaging apparatus 200 is an example of the original data. Hereinafter, in order to simplify the description, it is assumed that the original data is the captured image 250.

(Terminal 100)

The terminal 100 is connected to the imaging apparatus 200 so as to be able to communicate with each other via the communication network 300. The terminal 100 may be built in the imaging apparatus 200. The terminal 100 is further connected to the server 400 so as to be able to communicate with each other via the Internet 600.

Figure 2:
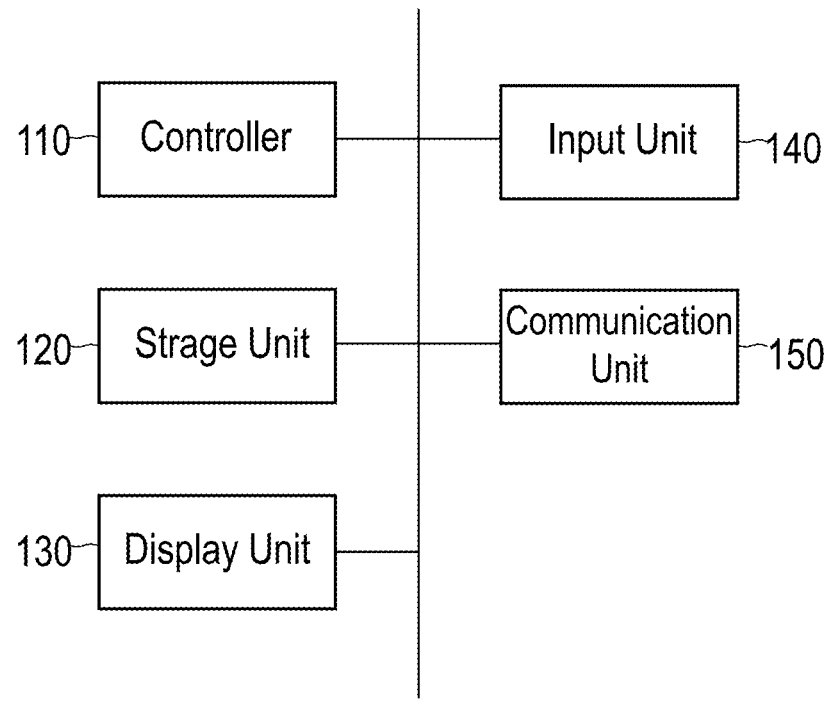
FIG. 2 is a block diagram illustrating a hardware structure of a terminal.

FIG. 2 is a block diagram illustrating a hardware structure of the terminal 100. The terminal 100 includes a controller (terminal controller) 110, a storage unit 120, a display unit 130, an input unit 140, and a communication unit 150. These components are connected to each other via a bus.

The controller 110 includes a central processing unit (CPU), and controls each unit of the terminal 100 and performs calculation processing according to a program or instructions.

The storage unit 120 can include a random access memory (RAM), a read only memory (ROM), and a solid state drive (SSD). The RAM temporarily stores instructions and data as a work area of the controller 110. The ROM stores various instructions and various data in advance. The SSD stores various instructions including an operation system and various data.

The display unit 130 is, for example, a liquid crystal display, and displays various types of information.

The input unit 140 includes, for example, a touch panel or various keys. The input unit 140 is used for various operations and inputs.

The communication unit 150 is an interface for communicating with an external device. For communication, a network interface according to a standard such as Ethernet (registered trademark), SATA, PCI Express, USB, or IEEE 1394 can be used. In addition, a wireless communication interface such as Bluetooth (registered trademark), IEEE 802.11, or 4G can be used for communication.

(Imaging Apparatus 200)

For example, the imaging apparatus 200 is disposed on a ceiling or a wall of a living room of a subject 500, or disposed on a ceiling or upper side of a wall of a store, a factory, or the like. The imaging apparatus 200 captures a predetermined captured range from a position where the subject 500 can be looked down, and outputs a captured image 250. The captured image 250 includes an image including the subject 500. The imaging apparatus 200 includes a wide-angle camera. The imaging apparatus 200 may be a stereo camera capable of capturing a three-dimensional captured image 250. The imaging apparatus 200 can capture a captured area as the captured image 250 of a moving image with a frame rate of, for example, 15 fps to 30 fps. The captured image 250 includes a moving image and a still image. The captured image 250 may be, for example, a black-and-white image and an image of 128 pixels×128 pixels. The captured image 250 may be a color image. The imaging apparatus 200 transmits the captured image 250 to the terminal 100.

(Communication Network 300)

As the communication network 300, a network interface according to a wired communication standard such as Ethernet (registered trademark) may be used. As the communication network 300, a network interface according to a wireless communication standard such as Bluetooth (registered trademark) or IEEE 802.11 may be used.

(Server 400)

Figure 3:
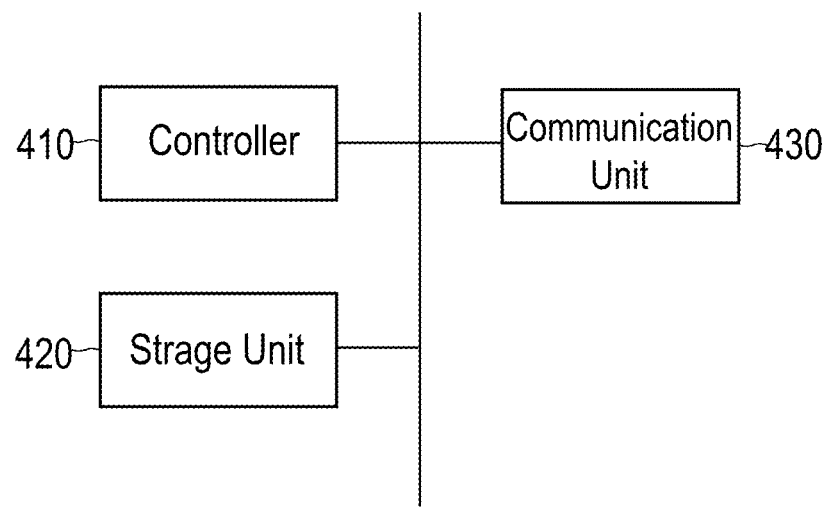
FIG. 3 is a block diagram illustrating a hardware structure of a server.

FIG. 3 is a block diagram illustrating a hardware structure of the server 400. The server 400 includes a controller (server controller) 410 including a central processing unit (CPU), a storage unit 420, and a communication unit (communication interface) 430. These components are connected to each other via a bus. The server 400 constitutes an analysis device. The communication unit 430 may constitute a receptor. In one or more embodiments, the communication unit 430 may comprise a transceiver. Since the controller 410, the storage unit 420, and the communication unit 430, which are components of the server 400, are similar to the corresponding components of the terminal 100, the description thereof will be omitted. The controller 410 constitutes an analyzer. The controller 410 constitutes an outputter together with the communication unit 430.

The server 400 is, for example, a cloud server virtually constituted by a plurality of servers disposed over the Internet 600. The server 400 may be configured by one computer.

Figure 4:
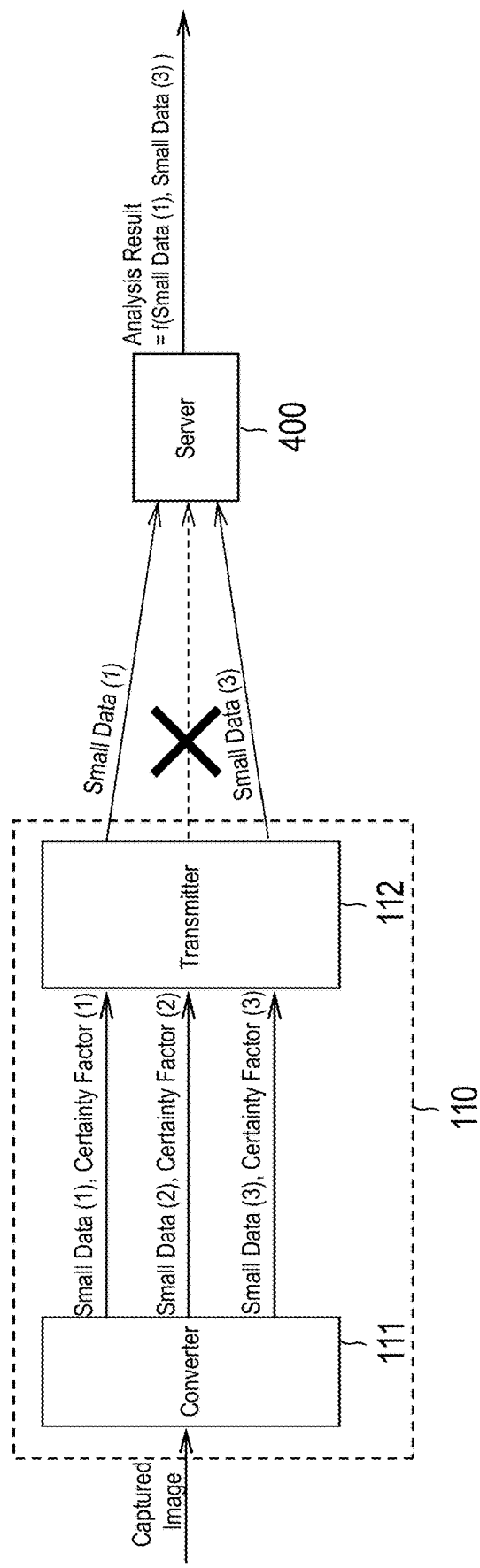
FIG. 4 is a functional block diagram illustrating functions of the terminal and the server.
Figure 5:
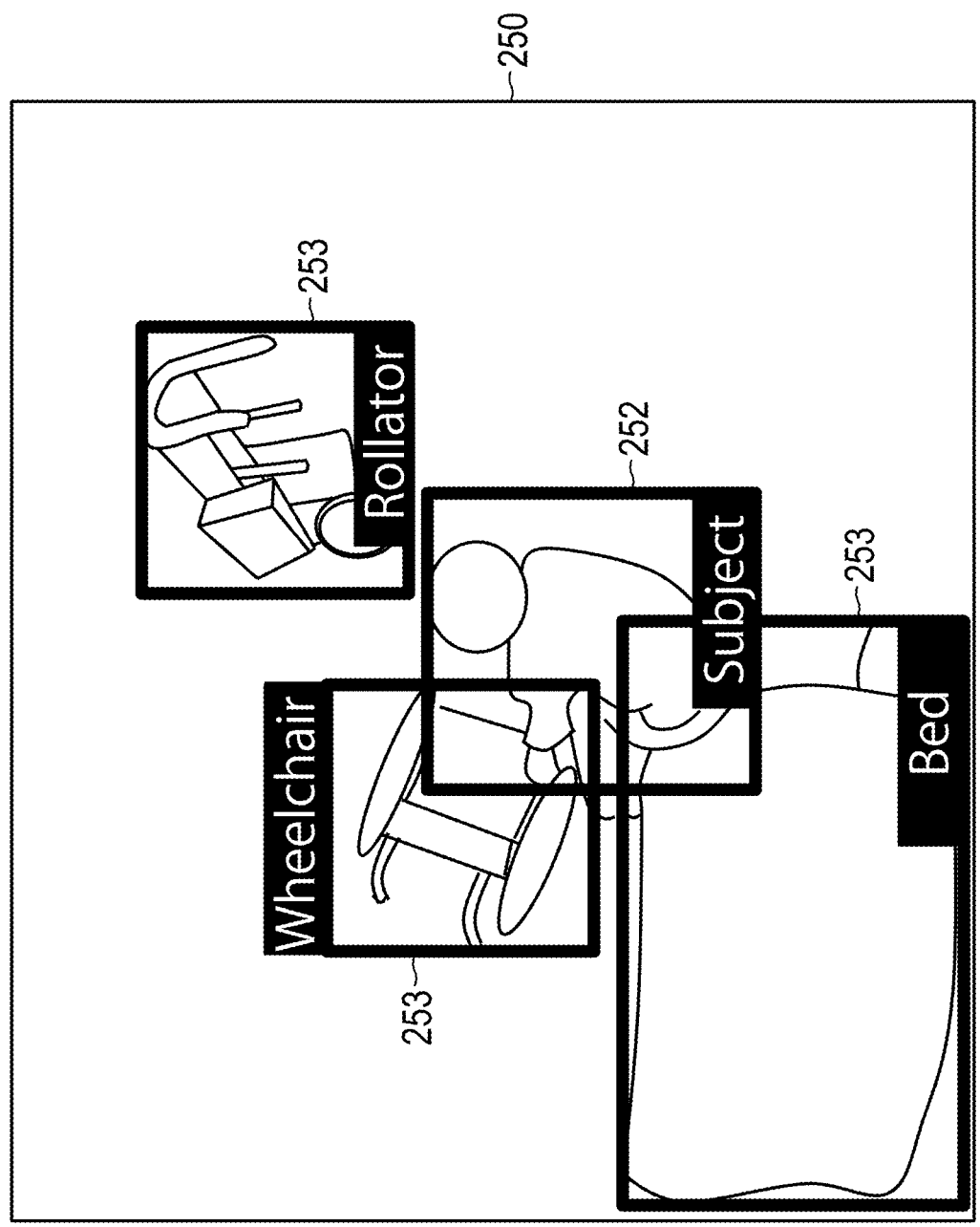
FIG. 5 is a diagram illustrating a person area and a surrounding object area on an image.
Figure 6:
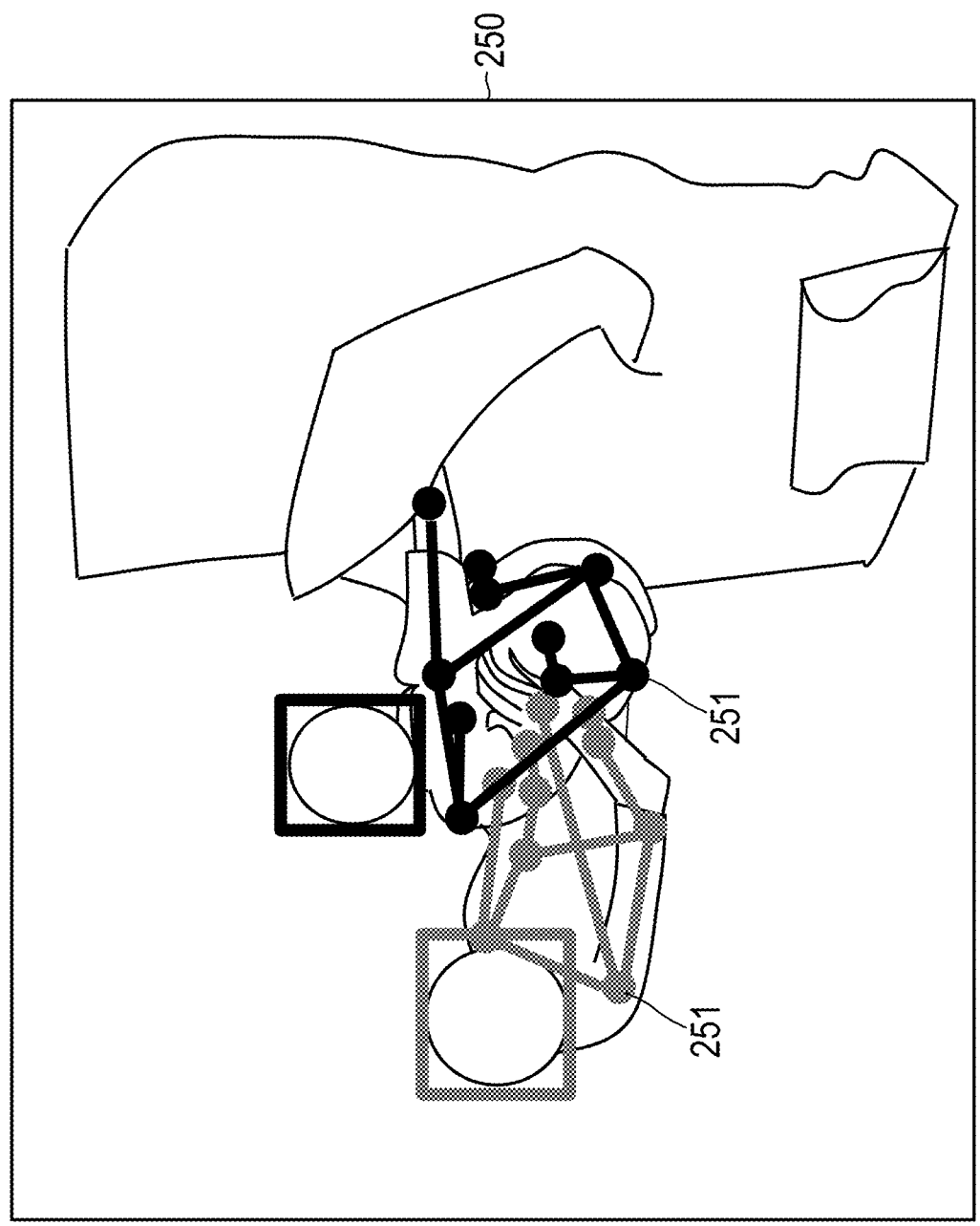
FIG. 6 is a diagram illustrating joint points on an image.

FIG. 4 is a functional block diagram illustrating functions of the controller 110 which is a part of the terminal 100 and the server 400. FIG. 5 is a diagram illustrating a person area 252 and a surrounding object area 253 in the captured image 250. FIG. 6 is a diagram illustrating joint points 251 in the captured image 250.

As illustrated in FIG. 4, the terminal 100 includes a converter 111 and a transmitter 112 as functions of the controller 110. The controller 110 also functions as an acquirer that acquires the original data from the edge device.

The converter 111 converts the captured image 250, which is the original data, into small data (also referred to as processed data) having a size (data amount) smaller than that of the original data and a certainty factor (hereinafter, simply referred to as "certainty factor") of the small data. The converter 111 converts the captured image 250, which is the original data, into the small data and the certainty factor by using a learned model of a neural network (hereinafter, referred to as "NN") learned using a combination of the captured image 250, which is the original data, and a correct answer of the small data corresponding to the captured image 250 as teacher data. The small data (processed data) includes data in which an object cannot be specified in an image, specifically, each of the coordinates of the joint points 251 (hereinafter, also simply referred to as "joint points 251") and a position of an area where the object of each category exists (hereinafter, referred to as "object area"). Hereinafter, in order to simplify the description, the small data will be described as at least one of the joint points 251 of a person and the object area other than the person (hereinafter, also simply referred to as "surrounding object area 253").

The converter 111 converts the captured image 250, which is the original data, into the small data and the certainty factors of the small data as follows.

The converter 111 detects the object area where the object (object) exists from the captured image 250 (more specifically, each frame of the captured image 250) received and acquired from the imaging apparatus 200, and estimates a category (class) of the object included in the detected object area. The category of the object includes, for example, a person, a wheelchair, a bed, and a rollator. The category of the object can be estimated by calculating a likelihood for each predetermined category including a person for each object area and specifying the category having a highest likelihood. The detection of the object area and the calculation of the likelihood for each category can be performed by using a known machine learning technique using an NN such as Faster R-CNN. The category of the object is added as a tag to the small data of the surrounding object area 253 and used for analysis in the server 400.

In the example of FIG. 5, the wheelchair, the bed, and the rollator are detected as the surrounding object areas 253 on the captured image 250. In addition, the subject 500 who is a resident is detected as the object area where the category of the object is "person" (hereinafter, referred to as a "person area 252". In FIG. 5, an action of the subject 500 trying to get on the wheelchair is assumed from a relationship between the surrounding object area 253 that is the wheelchair and the person area 252 (alternatively, joint points 251 detected from the person area 252, which will be described later).

The converter 111 further detects the joint points 251 for the person area 252. The joint points 251 can be estimated for each individual joint point 251 as coordinates having the highest likelihood by generating a heat map for each individual joint point 251 based on the person area 252. The heat map can be generated by, for example, a known machine learning technique using an Hourglass network. In a case where the captured image 250 is the three-dimensional captured image 250, the converter 111 detects the joint points 251 including height information and depth information. The converter 111 may further detect a posture of the subject 500 by using a known machine learning technique using the NN based on the joint points 251. The detected posture is added as a tag to the small data of the joint point 251, and can be used for analysis in the server 400.

In the example of FIG. 6, two person's joint points 251 are detected respectively. In FIG. 5, the joint points 251 of the resident who is the subject 500 are illustrated in black. In addition, the joint points 251 of a care staff who is another subject 500 are illustrated in gray. From the relationship between the two person's joint points 251, an action which one subject 500 receives care from the other subject 500 is assumed.

The converter 111 calculates the certainty factor of the small data. For the joint point 251, the certainty factor may be an average value of maximum values of the likelihoods in the heat map of each of the joint points 251, or a weighted average value in consideration of an importance (for example, a joint point 251 of a head may be set as having a highest importance) of each of the joint points 251. In this case, the certainty factor may be a comprehensive certainty factor of the entire plurality of joint points 251 (combination of the joint points 251) detected from one captured image 250 (frame). The certainty factor may be an individual certainty factor of the plurality of joint points 251 detected from one captured image 250 (frame). For the surrounding object area 253, the certainty factor may be a likelihood for each category.

The transmitter 112 controls transmission of the small data and the certainty factor to the server 400 by the communication unit 150. Specifically, the transmitter 112 performs control not to transmit the original data to the server side, but to transmit small data whose certainty factor is equal to or greater than a first threshold to the server 400, and not to transmit small data whose certainty factor is less than the first threshold to the server 400. As a result, it is possible to transmit small data whose certainty factor is equal to or greater than a certain value without transmitting the original data to the server side, solve the issues of the communication volume, the privacy protection, and the data management cost, and transmit small data with higher accuracy to the server side.

In FIG. 4, a combination of small data (1) and a certainty factor (1), a combination of small data (2) and a certainty factor (2), and a combination of small data (3) and a certainty factor (3) are respectively the pieces of small data and the certainty factors respectively converted from the frames of the captured images 250 that are temporally adjacent. In the example of FIG. 4, since the certainty factor (2) of the small data (2) is less than the first threshold, control is performed such that the combination of the small data (1) and the certainty factor (1) and the combination of the small data (3) and the certainty factor (3) are transmitted to the server 400, and the combination of the small data (2) and the certainty factor (2) is not transmitted to the server 400.

Note that the transmitter 112 may detect a predetermined action (event) of the subject 500, and selectively transmit only the small data of the captured image 250 in which the predetermined action is detected to the server 400. The predetermined action can be detected by a known method based on the plurality of joint points 251 detected from each of the plurality of frames of the captured image 250. The predetermined action may be detected based on the plurality of joint points 251 by using, for example, a learned model of the NN learned using combination of the plurality of joint points 251 and a correct answer of the action as teacher data. In this case, among the pieces of small data of the captured image 250 in which the predetermined action is detected, only the small data whose certainty factor is equal to or greater than the first threshold can be transmitted to the server 400.

Figure 7:
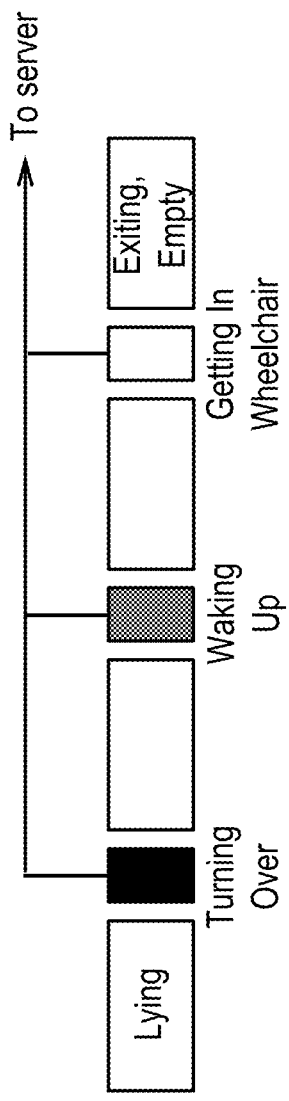
FIG. 7 is an explanatory diagram illustrating an example in which small data is selectively transmitted from the terminal to the server.

FIG. 7 is an explanatory diagram illustrating an example in which the small data is selectively transmitted from the terminal 100 to the server 400. FIG. 7 illustrates as the predetermined actions turning over, waking up, and getting in a wheelchair. The predetermined action may include a tumble and a fall.

In the server 400, analysis by a function f is executed by using a plurality of (two) pieces of small data, that is the received small data (1) and small data (3), and an analysis result is output by being transmitted to a terminal accessible to the server 400. For example, the server 400 can analyze an activity amount of the subject 500 who is the resident based on the joint point 251 of the small data (1) and the joint point 251 of the small data (3). The server 400 can output the analysis result based on the plurality of pieces of the small data by using a learned model of the NN learned by using a combination of the plurality of pieces of small data and the correct answer of the analysis result as teacher data. The server 400 may output the analysis result based on the plurality of pieces of small data by multiple regression analysis. The function f may be a function that analyzes the activity amount, a sleep time, a bed leaving at night (the number of times and the time), a wake-up time, a walking speed, an abnormal behavior, and a behavior pattern of the subject 500 by using a plurality of pieces of small data (1) to (3). The function f may be a function that analyzes the posture of the subject 500.

As described above, the small data is, for example, the joint points 251, but may be a combination of the plurality of joint points 251 detected from one captured image 250 (frame), or may be an individual joint point 251 among the plurality of joint points 251 detected from one captured image 250 (frame). Furthermore, the small data may be a combination of the combination of the plurality of joint points 251 and the surrounding object area 253, detected from one captured image 250 (frame).

Note that, for example, in a case where the original data is data of a document related to chemical substance regulation and small data (n) converted from the data of the document is data of regulatory contents, a chemical substance that can be described in the future may be analyzed by calculation using the function f.

The analysis result by the server 400 includes, for example, the sleep time, the bed leaving at night (the number of times and the time), the wake-up time, the walking speed, the abnormal behavior, and the behavior pattern in addition to the activity amount described above.

Figure 10:
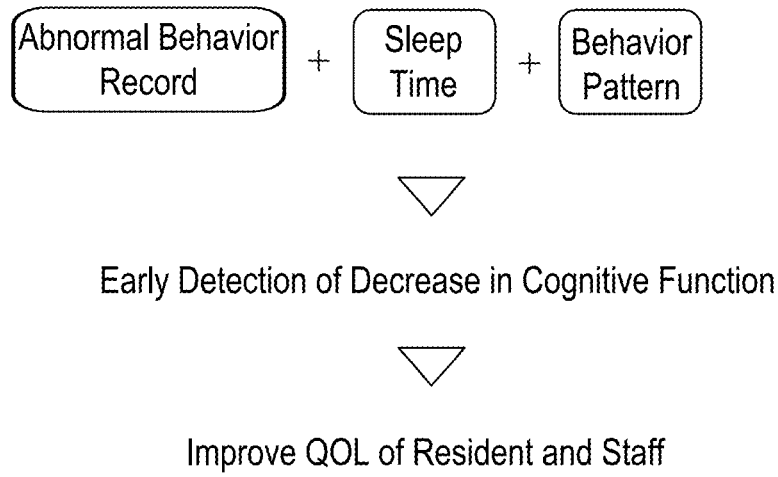
FIG. 10 is an explanatory diagram illustrating an example of use of an analysis result by the server.

FIGS. 8 to 10 are explanatory diagrams illustrating examples of use of analysis results by the server 400.

In the example of FIG. 8, a daytime care plan is changed such that the activity amount of the subject 500 in the daytime is increased by using the bed leaving at night, the activity amount at night, and the sleep time which are the analysis results. As a result, it is possible to reduce a burden on night staffs.

In the example of FIG. 9, as a result of using the wake-up time and the walking speed, which are analysis results, together with a physical deconditioning record included in data of a care record, deterioration in the physical condition of the subject 500 is detected, and the care is changed according to the deterioration in the physical condition. As a result, it is possible to reduce a risk of hospitalization and improve an operation rate of a caring facility. Note that the care record can be transmitted from a mobile terminal or the like of the care staff to the server 400 and stored in the storage unit 420.

In the example of FIG. 10, as a result of using the sleep time and the behavior pattern, which are the analysis results, together with an abnormal action record included in the data of the care record, a decrease in a cognitive function of the subject 500 is detected early. This can improve a QOL of the resident and the staff.

Figure 11:
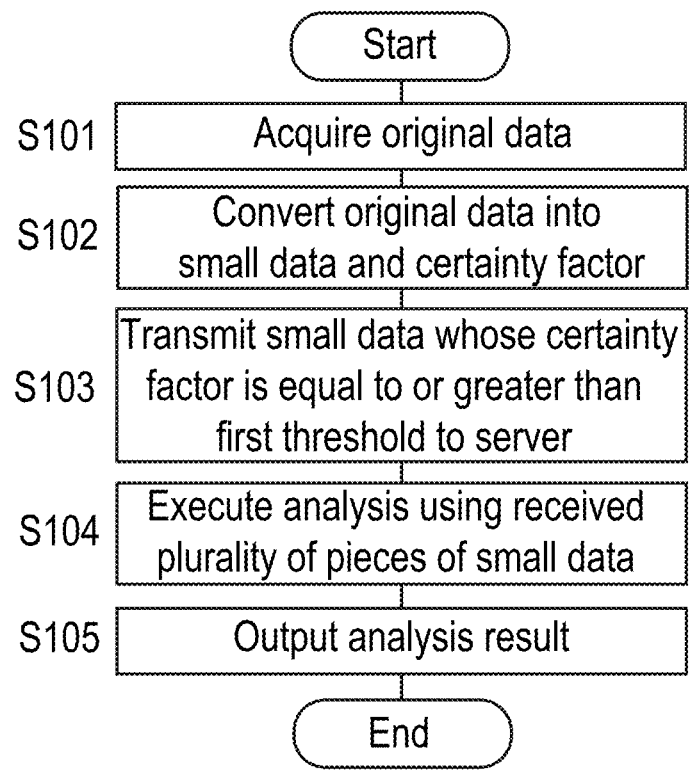
FIG. 11 is a flowchart illustrating an operation of the analysis system.

FIG. 11 is a flowchart illustrating an operation of the analysis system 10. This flowchart can be executed by causing the terminal 100 and the server 400 to operate in cooperation by instructions executed by the controller 110 of the terminal 100 and the controller 410 of the server 400, respectively.

The controller 110 receives and acquires the captured image 250, which is the original data, from the imaging apparatus 200 (S101).

The controller 110 converts the captured image 250, which is the original data, into the small data such as the joint points 251 and the certainty factors of the small data (S102).

The controller 110 transmits the joint points 251 and the like, that are small data whose certainty factors are equal to or greater than the first threshold, to the server 400 without transmitting the original data to the server side (S103).

The controller 410 executes analysis using the plurality of joint points 251 and the like, that are pieces of small data, received by the server 400 (S104). Note that the controller 410 can accumulate the received small data in the storage unit 420 and execute analysis using the small data for a predetermined period. The predetermined period depends on an analysis content, but may be, for example, one day, one week, one month, six months, or one year.

The controller 410 outputs an analysis result (S105).

Second Embodiment

A second embodiment will be described. The present embodiment is different from the first embodiment in the following points. In the first embodiment, transmission of the small data from the terminal 100 to the server 400 is controlled based on the certainty factor, and the server 400 executes analysis using the received small data. On the other hand, in the present embodiment, regardless of the certainty factor, the combination of the small data and the certainty factor is transmitted from the terminal 100 to the server 400, and the server 400 executes analysis using the small data and the certainty factor. Since the present embodiment is similar to the first embodiment in other points, redundant description will be omitted or simplified.

Figure 12:
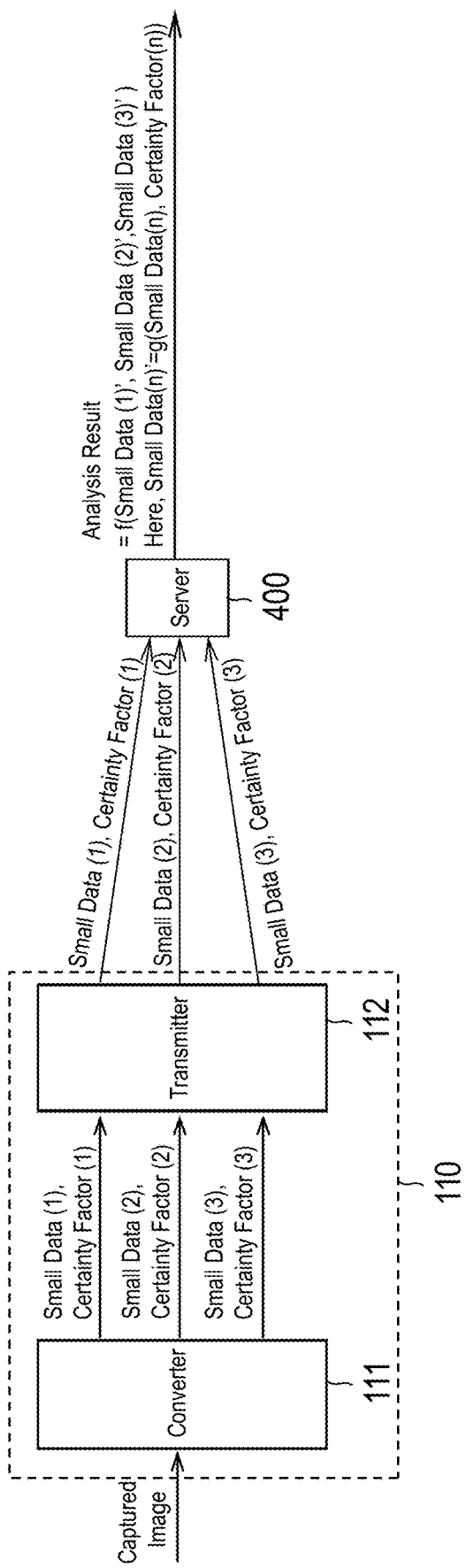
FIG. 12 is a functional block diagram illustrating functions of the terminal and the server.

FIG. 12 is a functional block diagram illustrating functions of the controller 110 which is parts of the terminal 100 and the server 400 which are parts of the terminal 100.

The terminal 100 includes the converter 111 and the transmitter 112 as functions of the controller 110.

The converter 111 converts the captured image 250, which is the original data, into the small data and the certainty factor.

The transmitter 112 transmits the small data to the server 400 in combination with the certainty factor.

In FIG. 12, a combination of the small data (1) and the certainty factor (1), a combination of the small data (2) and the certainty factor (2), and a combination of the small data (3) and the certainty factor (3) are combinations of the pieces of small data and the certainty factors respectively converted from temporally adjacent frames of the captured image 250. In the example of FIG. 12, the original data is not transmitted to the server side as in the first embodiment, but regardless of the certainty factor, the combination of the small data (1) and the certainty factor (1), the combination of the small data (2) and the certainty factor (2), and the combination of the small data (3) and the certainty factor (3), which are converted from the captured image 250, are transmitted to the server 400. That is, all the combinations of the pieces of small data and the certainty factors converted from the captured image 250 are transmitted to the server 400. Therefore, the small data can be transmitted together with the certainty factor without transmitting the original data to the server side, so that the issues of the communication volume, the privacy protection, and the data management cost can be solved, and the highly accurate data can be processed on the server side.

The server 400 executes analysis using the received pieces of small data and certainty factors, and outputs an analysis result. Specifically, for example, the server 400 converts the small data (n) into small data (n)' (n is, for example, 1 to 3) based on a certainty factor (n) by a function g, and executes analysis using converted plurality of pieces of the small data (1)' to the small data (3)' by the function f. The function g may be, for example, calculation of selection of the small data based on the certainty factor. That is, the function g may be a function that does not output the small data of which the certainty factor is less than a second threshold to a calculation module of the function f at a subsequent stage. The function g may be a function of weighting the small data according to the certainty factor. The function f may be a function that analyzes the activity amount, the sleep time, the bed leaving at night (the number of times and the time), the wake-up time, the walking speed, the abnormal behavior, and the behavior pattern of the subject 500 using the converted plurality of pieces of small data (1)' to small data (3)'. The function f may be a function that analyzes the posture of the subject 500.

The server 400 may output the analysis result based on the plurality of pieces of the small data and the certainty factors by using the learned model of the NN learned by using the combinations of the plurality of pieces of small data and the certainty factors, and a predetermined correct answer of the analysis result as teacher data. The server 400 may output the analysis result based on the plurality of pieces of small data and the certainty factors by multiple regression analysis.

As described above, the small data is, for example, the joint points 251, but may be a combination of the plurality of joint points 251 detected from one captured image 250 (frame), or may be an individual joint point 251 among the plurality of joint points 251 detected from one captured image 250 (frame). Furthermore, the small data may be a combination of the combination of the plurality of joint points 251 detected from one captured image 250 (frame) and the surrounding object area 253.

Note that, for example, in a case where the original data is data of the document related to chemical substance regulation and the small data (n) converted from the data of the document is data of regulatory contents, the chemical substance that can be described in the future may be analyzed by calculation using the function g and the function f.

Figure 13:
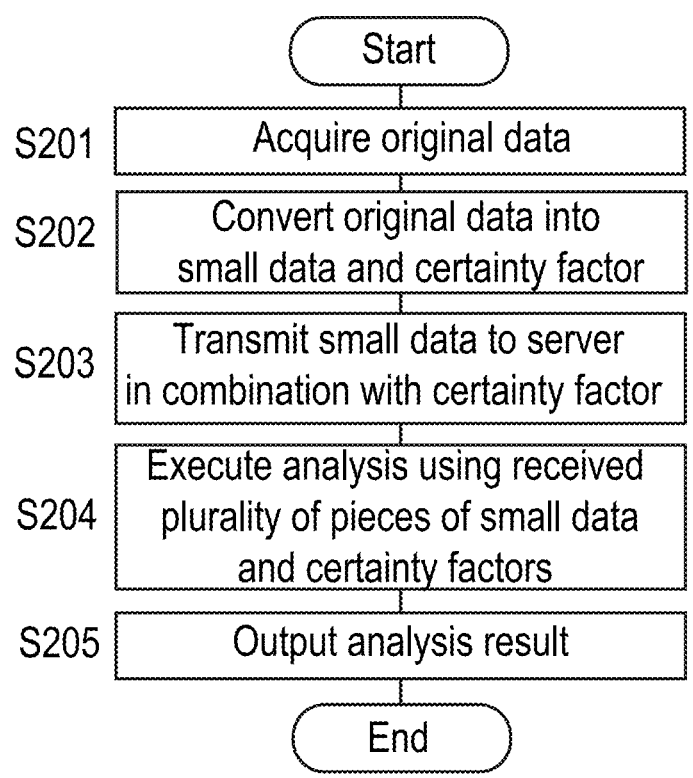
FIG. 13 is a flowchart illustrating an operation of the analysis system.

FIG. 13 is a flowchart illustrating an operation of the analysis system 10. This flowchart can be executed by causing the terminal 100 and the server 400 to operate in cooperation by instructions executed by the controller 110 of the terminal 100 and the controller 410 of the server 400, respectively.

The controller 110 receives and acquires the captured image 250, which is the original data, from the imaging apparatus 200 (S201).

The controller 110 converts the captured image 250, which is the original data, into the small data such as the joint point 251 and the certainty factors of the small data (S202).

The controller 110 transmits the joint point 251 and the like, that are the pieces of small data, to the server 400 in combination with the certainty factor without transmitting the original data to the server side (S203).

The controller 410 executes analysis using the plurality of joint points 251 and the like, that are the pieces of the small data and the certainty factors received by the server 400 (S204). Note that the controller 410 can accumulate the received pieces of small data and the certainty factors in the storage unit 420 and execute analysis using the pieces of small data and the certainty factors for the predetermined period. The predetermined period depends on an analysis content, but may be, for example, one day, one week, one month, six months or one year.

The controller 410 outputs the analysis result (S205).

Third Embodiment

A third embodiment will be described. The present embodiment is different from the first embodiment in the following points. In the first embodiment, the learned model of the converter 111 is not relearned. On the other hand, in the present embodiment, the learned model of the converter 111 is relearned by using a combination of the original data and the correct answer of the small data corresponding to the original data as teacher data. By making the learned model of the converter 111 relearn, the certainty factor for the small data becomes more accurate, and thus the accuracy of the analysis result is improved. Since the present embodiment is similar to the first embodiment in other points, redundant description will be omitted or simplified.

Figure 14:
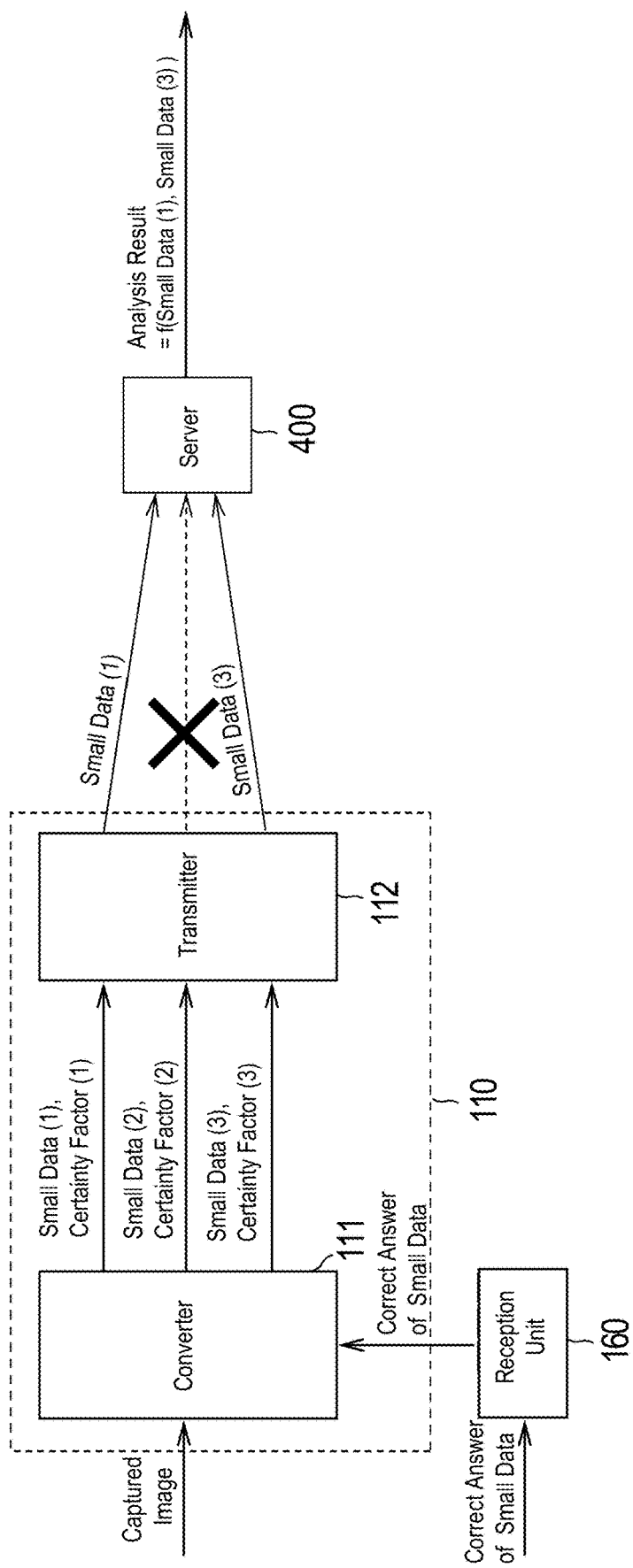
FIG. 14 is a functional block diagram illustrating functions of the terminal and the server.

FIG. 14 is a functional block diagram illustrating functions of the controller 110 which is the part of the terminal 100, a reception unit (reception device) 160, and the server 400.

The terminal 100 includes the converter 111 and the transmitter 112 as functions of the controller 110.

The converter 111 converts the captured image 250, which is the original data, into the small data and the certainty factor using the learned model of the NN.

The reception unit 160 receives a correct answer of the joint point 251 and the like that is small data corresponding to the captured image 250, which is the original data, and transmits the received correct answer to the controller 110. Note that the reception unit 160 may exist independently of the terminal 100, or may exist in the terminal 100 or the server 400. The reception unit 160 can include, for example, a computer terminal connected to the terminal 100 so as to be able to communicate with each other.

The converter 111 makes the learned model relearn by using the combination of the captured image 250, which is the original data, and the correct answer of the joint point 251 and the like that is small data corresponding to the captured image 250, as teacher data. Note that the converter 111 compares the joint point 251 and the like, that is the small data obtained by converting the captured image 250 by the learned model before relearning, with the correct answer of the joint point 251 and the like received by the reception unit 160, and can vary the first threshold according to the relationship between the comparison result and the certainty factor. For example, even when the certainty factor is relatively low, in a case where a difference between the joint point 251 and the like that is the small data and the correct answer of the joint point 251 and the like received by the reception unit 160 is relatively small (for example, it is equal to or less than a predetermined threshold), the first threshold can be lowered.

Fourth Embodiment

A fourth embodiment will be described. The present embodiment is different from the second embodiment in the following points. In the second embodiment, there is no input of the correct answer of the small data in the server 400. On the other hand, in the present embodiment, the reception unit 160 receives the correct answer of the small data and further transmits the correct answer of the small data to the server 400, so that the analysis method (function g) using the certainty factor in the server 400 can be changed based on the correct answer of the small data. According to the present embodiment, the accuracy of the analysis result can be further improved by assigning correct data to the server 400 side. Since the present embodiment is similar to the second embodiment in other points, redundant description will be omitted or simplified.

Figure 15:
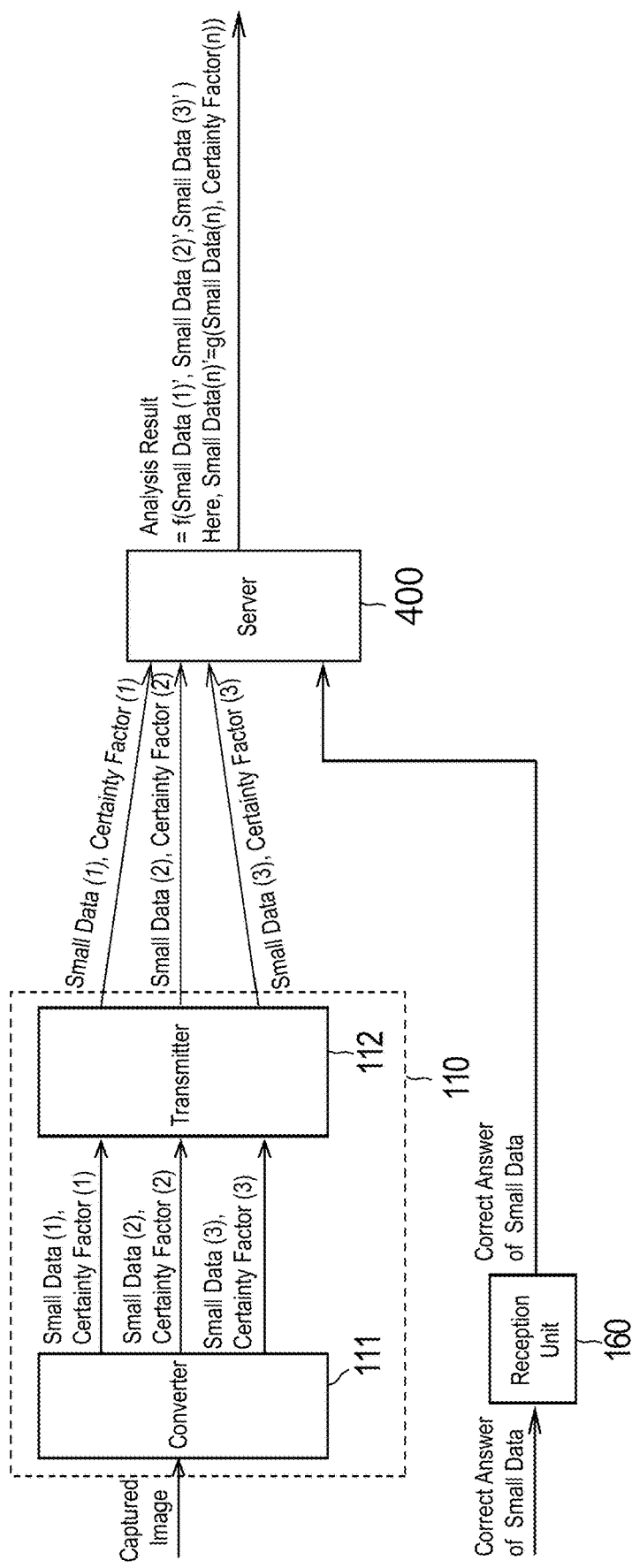
FIG. 15 is a functional block diagram illustrating functions of the terminal and the server.

FIG. 15 is a functional block diagram illustrating functions of the controller 110 which is the part of the terminal 100, the reception unit 160, and the server 400.

The terminal 100 includes the converter 111 and the transmitter 112 as functions of the controller 110.

The converter 111 converts the captured image 250, which is the original data, into the small data and the certainty factor using the learned model of the NN.

The reception unit 160 receives the correct answer of the joint point 251 that is small data corresponding to the captured image 250, which is the original data, and transmits the received correct answer to the server 400. Note that the reception unit 160 may exist independently of the terminal 100, or may exist in the terminal 100 or the server 400. The reception unit 160 can include, for example, the computer terminal connected to the terminal 100 and the server 400 so as to be able to communicate with each other. In addition, the reception unit 160 may be a function of the controller 410 of the server 400.

In the reception unit 160, the correct answer of the joint point 251 and the like that is the small data corresponding to the captured image 250, which is the original data is received. The server 400 receives the correct answer of the joint point 251 and the like from the reception unit 160, and can change the analysis method (function g) using the certainty factor in the server 400 based on the received correct answer. The server 400 compares the joint point 251 and the like, that is the small data obtained by converting the captured image 250 by the learned model of the converter 111, with the correct answer of the joint point 251 and the like received by the reception unit 113, and can change the analysis method (function g) using the certainty factor according to the relationship between a comparison result and the certainty factor. The analysis method (function g) can be changed according to the result, and for example, the method itself may be changed, or the threshold may be simply adjusted. The server 400 may change the analysis method (function g) using the certainty factor in consideration of the analysis content (function f). For example, even when the certainty factor is relatively low, in a case where the difference between the joint point 251 and the like that is the small data and the correct answer of the joint point 251 and the like received by the reception unit 160 is relatively small (for example, it is equal to or less than a predetermined threshold), the second threshold for selecting the joint point 251 and the like that is the small data by the function g can be lowered.

Fifth Embodiment

A fifth embodiment will be described. The present embodiment is different from the second embodiment in the following points. In the second embodiment, as an example, the server 400 outputs the analysis result based on the plurality of pieces of small data and the certainty factors acquired from the converter 111 by using the learned model of the NN learned by using the combination of the plurality of pieces of small data and the certainty factors, and the correct answer of the predetermined analysis result, which are prepared in advance, as the teacher data. On the other hand, in the present embodiment, teacher data for generating the learning model in the server 400 is different from that in the second embodiment. In the present embodiment, as the plurality of pieces of small data and the certainty factors that are the teacher data used for generating the learned model in the server 400, the plurality of pieces of small data and the certainty factors output from the converter 111 and the correct answer of the analysis result transmitted from the reception unit 160 to the server 400 are used. Since the present embodiment is similar to the second embodiment in other points, redundant description will be omitted or simplified.

Figure 16:
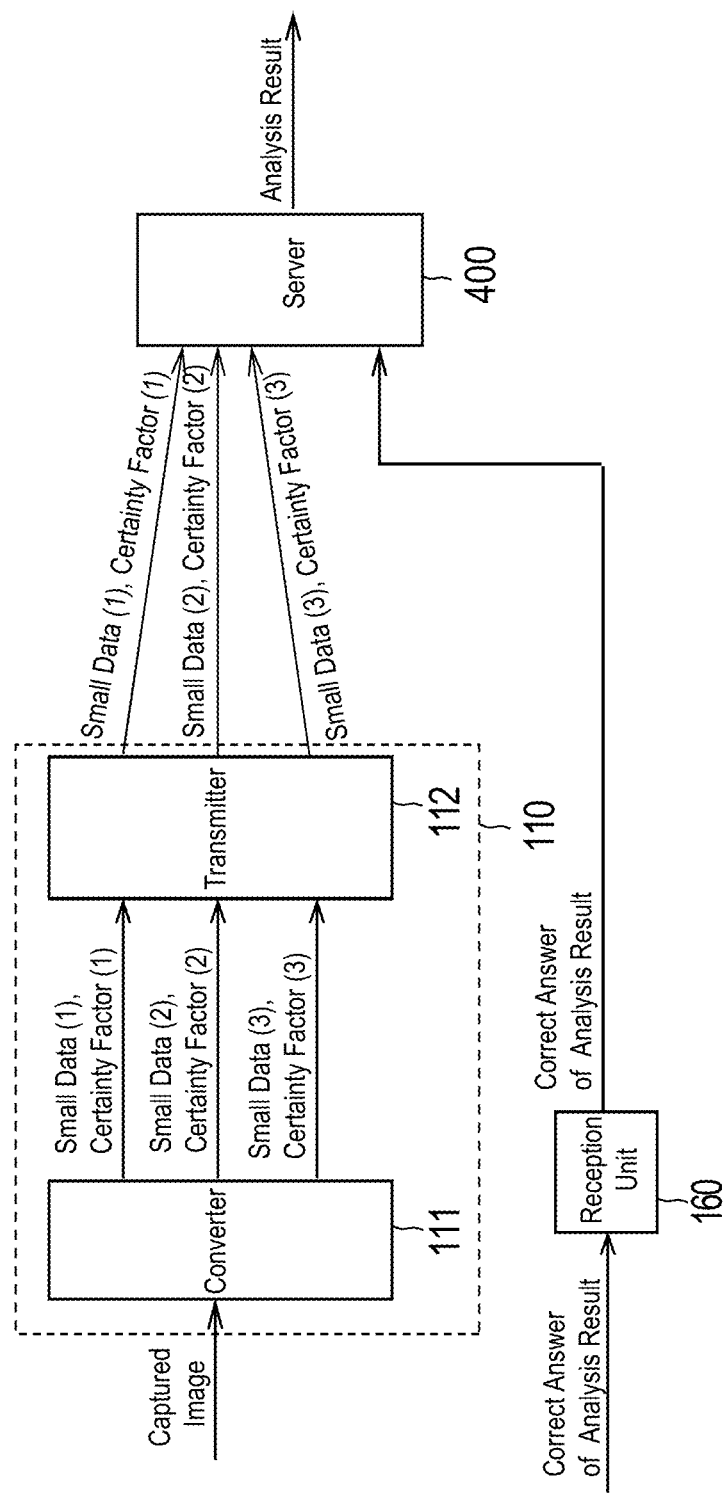
FIG. 16 is a functional block diagram illustrating functions of the terminal and the server.

FIG. 16 is a functional block diagram illustrating functions of the controller 110 which is the part of the terminal 100, the reception unit 160, and the server 400.

The terminal 100 includes the converter 111 and the transmitter 112 as functions of the controller 110.

The converter 111 converts the captured image 250, which is the original data, into the small data and certainty factor using the learned model of the NN.

The reception unit 160 receives the correct answer of the analysis result by the server 400 corresponding to the captured image 250, which is the original data, and transmits the correct answer to the server 400. The correct answer of the analysis result is, for example, the activity amount of the subject 500. The activity amount that is the correct answer of the analysis result can be measured by using an acceleration sensor or the like attached to the subject 500. Note that the reception unit 160 may exist independently of the terminal 100, or may exist in the terminal 100 or the server 400. The reception unit 160 can include, for example, a computer terminal connected to the terminal 100 and the server 400 so as to be able to communicate with each other. In addition, the reception unit 160 may be a function of the controller 410 of the server 400.

The server 400 generates the learned model of the server 400 obtained by learning, using as teacher data, a combination of the joint points 251 and the like and the certainty factors, that are the plurality of pieces of small data obtained by respectively converting a plurality of the captured images 250, which are pieces of original data, by the converter 111 by using the learned model of the converter 111, and the correct answer of the analysis result corresponding to the plurality of captured images 250. The generated learned model is used for analysis by the server 400.

The present embodiment has the following effects.

The original data is converted into the small data having the size smaller than that of the original data and certainty factor of the small data, at least the small data is transmitted to the server, the server performs analysis by using the plurality of pieces of small data, and the analysis result is output. As a result, it is possible to obtain new data with high reliability and high added value by transmitting data having the reduced size and analyzing the data at the transmission destination.

Further, control is performed such that the small data whose the certainty factor is equal to or greater than the first threshold is transmitted to the server, and the small data whose certainty factor is less than the first threshold is not transmitted to the server. As a result, the communication volume and the amount of data accumulated in the server can be further reduced.

Further, the combination of the small data and the certainty factor of the small data is transmitted to the server, and the server executes analysis using the small data and the certainty factor of the small data. As a result, new data with higher reliability and higher added value can be obtained.

Further, the server executes analysis using the plurality of pieces of the small data whose certainty factors are equal to or greater than the second threshold. As a result, the reliability of the analysis result by the server can be further improved.

Further, in the server, each of the pieces of small data is weighted by using the certainty factor, and the analysis using the weighted plurality of pieces of small data is executed. As a result, the reliability of the analysis result by the server can be further improved.

Further, the server executes analysis based on the small data and the certainty factor of the small data by using the learned model. As a result, the reliability of the analysis result by the server can be further improved.

Further, in the terminal, the original data is converted into the small data and the certainty factor by using the learned model, the correct answer of the small data corresponding to the original data is received, and the learned model is relearned by using the combination of the original data and the correct answer of the small data corresponding to the original data as the teacher data. As a result, it is possible to appropriately reduce the data communication volume and the like and improve the reliability of the analysis result by the server.

Furthermore, the first threshold is varied based on the small data, the certainty factor, and the correct answer. As a result, it is possible to more appropriately reduce the data communication volume and the like and improve the reliability of the analysis result by the server.

Furthermore, the correct answer of the small data corresponding to the original data is received, and the analysis method using the certainty factor in the server is changed based on the small data, the certainty factor, and the correct answer. As a result, the reliability of the analysis result by the server can be appropriately improved.

Further, the learned model of the server is generated by receiving the correct answer of the analysis result by the server corresponding to the original data, and learning, using as teacher data, the combination of the plurality of pieces of small data, certainty factors for each piece of small data which are converted from the plurality of pieces of original data by the learned model of the terminal, and a correct answer of the analysis result corresponding to each of the plurality of pieces of original data. As a result, since an estimated tendency (uncertainty) by the learned model of the terminal can be absorbed by the learned model of the server, the reliability of the analysis result by the server can be effectively improved.

The configuration of the analysis system 10 described above has been described as a main structure in describing the features of the above-described embodiments, but the structure is not limited to the above-described structure, and various modifications can be made within the scope of claims. In addition, the structure included in a general analysis system is not excluded.

In addition, in the above-described flowchart, some steps may be omitted, and other steps may be added. Some of each step may be executed simultaneously, or one step may be divided into a plurality of steps and executed.

Furthermore, the functions implemented by the NN in the above-described embodiments may be implemented by using machine learning means other than the NN or an approximate function.

In addition, means and methods for performing various processing in the analysis system described above can be implemented by either a dedicated hardware circuit or a programmed computer. The instructions may be provided by, for example, a computer-readable recording medium such as a USB memory or a digital versatile disc (DVD)-ROM, or may be provided online via a network such as the Internet. In this case, the instructions recorded in the computer-readable recording medium are usually transferred to and stored in a storage unit such as a hard disk. In addition, the instructions may be provided as independent application software, or may be incorporated into software of a device such as a detection unit thereof as one function.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST 10 analysis system
100 terminal
110 controller
111 converter
112 transmitter
120 storage unit
130 communication unit
140 input unit
150 communication unit
160 reception unit
200 imaging apparatus
250 captured image
251 joint point
252 person area
253 surrounding object area
300 communication network
400 server
500 subject

The invention claimed is:

1. An analysis system comprising:
a terminal that comprises a terminal controller; and
a server that comprises a server controller and a communication interface, wherein
the terminal controller:
acquires original data,
converts the original data into a plurality of pieces of small data each having a size smaller than a size of each piece of the original data and into certainty factors of respective pieces of the small data, and
transmits a combination of the small data and the certainty factors to the server, and
the server controller:
receives the combination of the small data and the certainty factors from the terminal via the communication interface,
weights the small data by using the certainty factors, respectively, and executes an analysis using the weighted small data, and
outputs an analysis result of the analysis.

2. The analysis system according to claim 1, wherein the terminal controller transmits, among the small data to the server, small data having the certainty factors each of which is equal to or greater than a first threshold, and does not transmit small data having the certainty factors each of which is less than the first threshold.

3. The analysis system according to claim 1, wherein the server controller executes the analysis using the small data having the certainty factors each of which is equal to or greater than a second threshold.

4. The analysis system according to claim 2, wherein the terminal controller converts the original data into the small data and into the certainty factors by using a learned model that is machine-learned,
the analysis system further comprises:
a reception device that receives a correct answer of the small data corresponding to the original data, and
the terminal controller makes the learned model relearn by using, as teacher data, a combination of the original data and the correct answer.

5. The analysis system according to claim 2, further comprising:
a reception device that receives a correct answer of the small data corresponding to the original data, wherein
the terminal controller varies the first threshold based on the small data, the certainty factors, and the correct answer.

6. The analysis system according to claim 1, further comprising:
a reception device that receives a correct answer of the small data corresponding to the original data, wherein
the server controller changes an analysis method using the certainty factors based on the small data, the certainty factors, and the correct answer.

7. An analysis system comprising:
a terminal that comprises a terminal controller; and
a server that comprises a server controller and a communication interface, wherein
the terminal controller:
acquires original data,
converts the original data into a plurality of pieces of small data each having a size smaller than a size of each piece of the original data and into certainty factors of respective pieces of the small data, and transmits a combination of the small data and the certainty factors to the server, and the server controller:
receives the combination of the small data and the certainty factors from the terminal via the communication interface,
executes an analysis based on the small data and the certainty factors using a learned model that is machine-learned, and
outputs an analysis result of the analysis.

8. The analysis system according to claim 7, further comprising:
a reception device that receives a correct answer of the analysis result corresponding to the original data, wherein
the server controller generates:
a learned model having learned by using, as teacher data, a combination of the small data, the certainty factors, and the correct answer of the analysis result.

9. A non-transitory computer-readable recording medium storing instructions executed by a computer to cause an analysis system comprising a terminal and a server to execute a process comprising:
acquiring original data in the terminal;
converting the original data into a plurality of pieces of small data each having a size smaller than a size of each piece of the original data and into certainty factors of respective pieces of the small data;
transmitting by the terminal a combination of the small data and the certainty factors to the server;
receiving by the server the combination of the small data and the certainty factors;
weighting by the server the small data by using the certainty factors, respectively, and executing an analysis using the weighted small data; and
outputting an analysis result of the analysis.

10. A non-transitory computer-readable recording medium storing instructions executed by a computer to cause an analysis device comprising a communication interface to execute a process comprising:
receiving, via the communication interface, a combination of a plurality of pieces of small data each having a size smaller than a size of each piece of original data, and certainty factors of respective pieces of the small data, the small data and the certainty factors being obtained by converting the original data;
weighting the small data by using the certainty factors, respectively, and executing an analysis using the weighted small data; and
outputting an analysis result of the analysis.

11. A control method for an analysis system comprising a terminal and a server, the method comprising:
acquiring original data in the terminal;
converting the original data into a plurality of pieces of small data each having a size smaller than a size of each piece of the original data and into certainty factors of respective pieces of the small data;
transmitting by the terminal a combination of the small data and the certainty factors to the server;
receiving by the server the combination of the small data and the certainty factors;
weighting by the server the small data by using the certainty factors, respectively, and executing an analysis using the weighted small data; and
outputting an analysis result of the analysis.

* * * * *